United States Patent [19]

Juutilainen

[11] Patent Number: 4,692,059
[45] Date of Patent: Sep. 8, 1987

[54] METHOD OF AND A MEANS FOR PROTECTING SHORES AGAINST OIL POLLUTANTS

[75] Inventor: Holger Juutilainen, Tampere, Finland

[73] Assignee: Tamfelt Oy Ab, Tampere, Finland

[21] Appl. No.: 826,619

[22] Filed: Feb. 6, 1986

[30] Foreign Application Priority Data

Feb. 6, 1985 [FI] Finland .................................. 850492

[51] Int. Cl.⁴ ............................................ E02B 15/04
[52] U.S. Cl. ..................................... 405/63; 405/60; 210/242.4; 210/693; 210/924
[58] Field of Search ................. 405/15, 21, 19, 23–26, 405/60, 63–72; 210/242.4, 693, 924

[56] References Cited

U.S. PATENT DOCUMENTS

| | | | |
|---|---|---|---|
| 1,397,891 | 11/1921 | Jones ................................. | 405/72 X |
| 3,667,235 | 6/1972 | Preus et al. .................. | 210/242.4 X |
| 3,702,657 | 11/1972 | Cunningham et al. ......... | 210/924 X |
| 3,831,760 | 8/1974 | Economy et al. .............. | 210/924 X |
| 3,962,083 | 6/1976 | Goldman ...................... | 210/242.4 X |
| 4,065,923 | 1/1978 | Preus ............................. | 210/924 X |
| 4,356,089 | 10/1982 | Challener et al. ............. | 210/924 X |
| 4,519,918 | 5/1985 | Ericsson et al. ................ | 210/924 X |

FOREIGN PATENT DOCUMENTS

| | | | |
|---|---|---|---|
| 2809731 | 9/1978 | Fed. Rep. of Germany ........ | 405/60 |
| 2492428 | 4/1982 | France ................................ | 405/71 |

OTHER PUBLICATIONS

Marshall Sittig, *Oil Spill Prevention and Removal Handbook*, (1974) (title page and page 452).
Paul E. Bakeman, Jr. and Albert L. Armstrong, "Systems Approach to Beach Protection for Oil Spill Incidents. Phase I. Feasibility Study", PB80-198997 (Oct. 1975, published by NTIS, 1980).
"Sorbent C: Petroleum Absorbent Material Widely Used for Oil Pollution Control" Clean Water, Inc., 1973.

*Primary Examiner*—Cornelius J. Husar
*Assistant Examiner*—Nancy J. Stodola
*Attorney, Agent, or Firm*—Robert R. Jackson

[57] ABSTRACT

To protect shores against oil pollutants, a web-like oil-retaining textile, is lowered into the water in parallel with the shore and the textile is drawn up on the shore over a strip of land which is in danger of getting polluted in such a manner that a longitudinal edge of the textile remains in the water. The oil which is thrown towards the shore by the waves adheres to the textile and is thereby prevented from contacting the strip of land.

One longitudinal edge of the textile is provided with a heavy foot rope and the other longitudinal edge is provided with floats and cords for drawing the textile up on the shore. The textile may be a needled fibrous felt having a width of 4 to 8 meters, the width being comparable to that of the strip of land to be protected.

8 Claims, 4 Drawing Figures

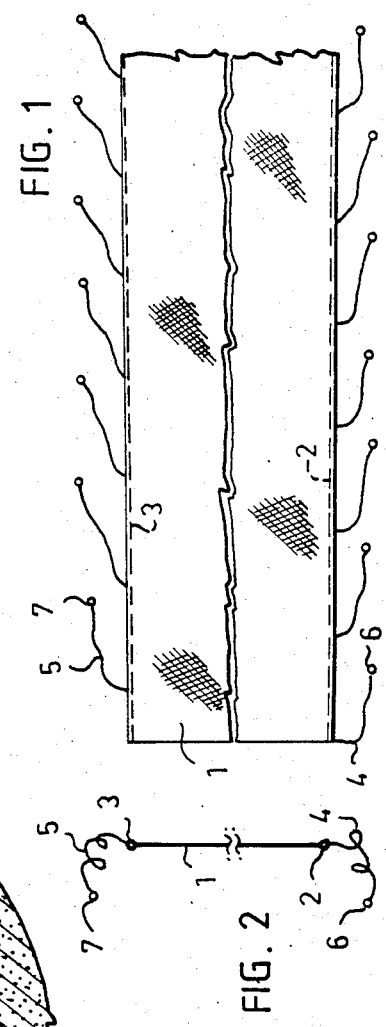
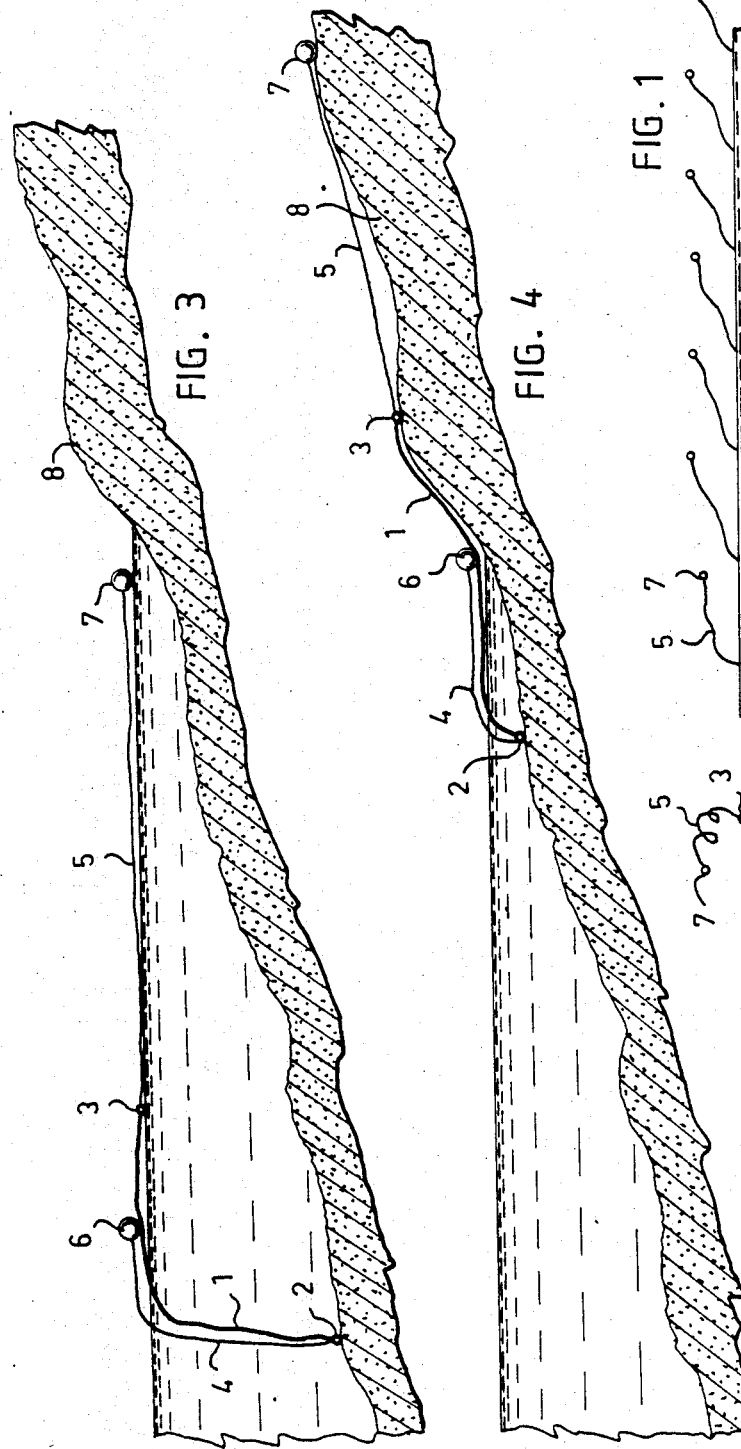

METHOD OF AND A MEANS FOR PROTECTING SHORES AGAINST OIL POLLUTANTS

This invention relates to a method of protecting shores against oil pollutants, wherein a means is positioned in the way of oil in the water to prevent the oil from spreading up on a shore.

Measures taken to prevent shores from being polluted from oil in the water have so far had as an aim mainly to prevent the oil in the water from reaching the shores by means of different kinds of booms and similar devices. If some oil has reached the shore in spite of the preventive measures, the polluting effect of the oil has been alleviated merely by clearing off the oil from the strip of land along the shoreline. Removing the oil has been carried out by means of shovels and the like and/or by spreading peat on the oil. Also burning has been used to some extent. However, the removal of the oil layers from gravel shores, for instance, is very difficult, because the oil easily spreads in between the stones, so that the stones themselves must be removed. Anyway, shores can never be completely cleaned this way.

The object of the present invention is to provide a method which avoids the above disadvantages and enables shores to be protected simply and with relatively inexpensive means. This object is achieved by means of a method according to the invention, which is characterized in that a web-like oil-retaining textile is lowered into the water in parallel with the shore, and that the textile is drawn in the transverse direction up on the shore over a strip of land which is in danger of getting polluted in such a manner that a longitudinal edge of the textile remains in the water.

The invention is based on the ideal that the oil which reaches the shore is prevented from clinging to the sand and stones on the shore by spreading a textile for the protection of a strip of land along the shoreline so that the oil clings to the textile. This also prevents the oil thrown by the waves from making contact with the sand and the stones. Such a textile can be easily lowered into the water near the shore from a vessel and drawn up on the shore to cover the strip of land so that the edge of the textile, in the water remains below the water level, thereby preventing the oil floating on the surface of the water from getting under the textile.

The invention also relates to a means for protecting shores against oil pollutants and this means is characterized in that it is formed by a web-like oil-adhering textile, such as a fibrous felt, one longitudinal edge of which is provided with weights, the other longitudinal edge being floatable and provided with means for drawing the textile in the transverse direction thereof.

Such a web-like textile can be easily lowered into the water from a vessel and thereafter drawn up on the shore to provide a cover for the strip of land in question.

The means according to the invention can, of course, be used also in the water near the shore to gather oil by lifting the longitudinal edges of the textile above the surface of the water. Oil can be easily gathered from the resulting trough. With the means according to the invention, oil can be easily cleared off from a strip of land along the shoreline and from the waterside as well.

The invention will be more closely described in the following with reference to the attached drawing, wherein FIGS. 1 and 2 are a front and an end view respectively of an oil protection means according to the invention, and FIGS. 3 and 4 are vertical sections which illustrate the carrying out of the method according to the invention by means of the oil protection means.

The oil protection means shown in the drawing is formed by a web-like textile 1, such as a needled fibrous felt, which in principle can be of any length, e.g. multiples of 100 meters and which can be e.g. rolled up for use. The textile can be manufactured of a synthetic raw material which is lighter than water and to which the oil adheres and which either as such or together with a tight film prevents oil from penetrating the web.

One longitudinal edge of the textile is provided with continuous foot rope 2 which is heavier than water, the other longitudinal edge being provided with buoyant head rope 3 which is lighter than water. Both ropes also serve as edge reinforcements. Both longitudinal edges are further provided with mutually spaced cords 4 and 5 respectively and floats 6 and 7 respectively are fastened to the ends of said cords.

To avoid oil damage the oil protection means is lowered into the water from a roll upon a vessel which is moving at a safe depth in parallel with the shore to be protected. It may be preferable to fasten floats 6 and 7 together with cords 4 and 5 to the textile when the textile is being unwound and lowered into the water or alternatively the floats can be fastened to the cords which have been attached to the textile in advance of the lowering operation. The longitudinal edge of the textile which is provided with foot rope 2 sinks to the bottom whereas the longitudinal edge provided with buoyant head rope 3 is carried towards the shore by the waves, as appears from FIG. 3.

The cords 5 can be grabbed from the floats 7, so that the textile 1 can be drawn from the shore over a strip of land 8 which is washed by the waves. The cords 5 are fastened on the shore to prevent displacement of the textile. The foot rope 2 presses the edge of the textile against the shore bottom below the water level, thereby preventing oil from getting under the textile.

After the oil has been accumulated on the textile, the cords 4 of floats can be grabbed and the foot rope can be lifted to the surface of the water, so that the textile can be drawn together and be transported away from the shore.

It is noted that the invention provides a simple way of protecting shores against oil pollutants by covering the endangered shore area with a means which can be contaminated and which can be relatively easily positioned in place and gathered away with the oil contained therein. It is well known that different kinds of web-like textiles and meshes can nowadays be manufactured in fairly large widths so that one textile width is usually enough for the protection of an endangered strip of land up to a sufficient distance from the water's edge. The textile can normally be e.g. 4 to 5 meters in width and in some special cases even 8 to 10 meters. If required, several textiles can be spread out in parallel over the area to be protected. The textile can be manufactured relatively thin because it must withstand handling without tearing mainly only when it is lowered into the water and gathered away from the shore. It is, of course, possible to keep in store textile rolls having different widths, to accommodate the variety of different widths corresponding to the strips of land to be protected in each particular case.

The drawing and the related description are only intended to illustrate the idea of the invention. In their details, the method and the means according to the invention may vary within the scope of the claims. The textile can be e.g. a woven felt or a laminated textile in which the upper side is made of a fibrous felt material and the lower side of a plastic film or some other oil-impermeable material.

I claim:

1. Method of protecting shores against oil pollutants, wherein a web-like oil-retaining textile (1) is positioned in the way of oil in the water to prevent the oil from spreading up on a shore, comprising the steps of (a) lowering the textile into the water in parallel with the shore and (b) drawing the textile in the direction perpendicular to the water's edge up on the shore over a strip of land (8) whichis in danger of getting polluted, in such a manner that a longitudinal edge (2) of the textile remains in the water.

2. Means for protecting a longitudinal shoreline strip of land adjacent to a body of water from oil pollutants being borne toward said land on the surface of said water, said means forming an oil-retaining plane, characterized in that said means is formed by a longitudinal strip of web-like oil-adhering textile (1) having a longitudinal axis disposable substantially parallel to said shoreline with a first longitudinal edge being in said water farther from said shoreline than said second longitudinal edge, said first longitudinal edge being provided with weights (2) for holding said first longitudinal edge below the surface of said water and therefore below said oil pollutants, said second longitudinal edge being floatable on said water and provided with means (5, 7) for drawing said second longitudinal edge and the portion of said textile adjacent to said second longitudinal edge out of said water on to said land in a direction transverse to said longitudinal axis, while leaving said first longitudinal edge in said water and submerged below the surface of said water.

3. Means according to claim 2, further characterized in that the width of the textile is at least equal to the width of the strip of land (8) to be protected.

4. Means according to claim 2 or 3, further characterized in that the textile (1) is made of a synthetic material which is lighter than water.

5. Means according to claim 2 or 3, further characterized in that one side of the textile (1) is provided with a film impermeable to oil.

6. Means according to claim 2 or 3, further characterized in that said first longitudinal edge of the textile (1) is provided with a continuous foot rope (2) heavier than water, said second longitudinal edge thereof being provided with a buoyant head rope (3) lighter than water.

7. Means according to claim 2, further characterized in that floats (6, 7) and cords (4, 5) are detachably fastened to said first and second edges of the textile (1).

8. Means according to claim 4 further characterized in that one side of the textile (1) is provided with a film impermeable to oil.

* * * * *